United States Patent [19]

Tabei et al.

[11] 4,340,426

[45] Jul. 20, 1982

[54] ADDITIVES FOR CONTINUOUS CASTING OF STEEL

[75] Inventors: Seikichi Tabei; Shigeo Sasaki, both of Koriyama, Japan

[73] Assignee: Nippon Chemical Industrial Co., Ltd., Tokyo, Japan

[21] Appl. No.: 158,033

[22] Filed: Jun. 9, 1980

[30] Foreign Application Priority Data

Jun. 9, 1979 [JP] Japan .................................. 54/72664
Feb. 1, 1980 [JP] Japan .................................. 55/9972

[51] Int. Cl.³ .............................................. C22B 9/10
[52] U.S. Cl. ........................................ 75/257; 75/53; 164/173
[58] Field of Search ...................... 75/257, 53; 164/55, 164/56

[56] References Cited

U.S. PATENT DOCUMENTS 3,998,624 12/1976 Harris .................................. 75/257
4,010,027 3/1977 White .................................. 75/257
4,189,318 2/1980 Zorev .................................. 75/257

*Primary Examiner*—P. D. Rosenberg
*Attorney, Agent, or Firm*—Sughrue, Mion, Zinn, Macpeak and Seas

[57] ABSTRACT

An additive for continuous casting of steel comprising as a base material a neutral to basic amorphous fluorine-containing calcium silicate containing up to 10% by weight $R_2O_3$, wherein R represents Al and F, and up to 1.5% by weight $P_2O_5$; this additive prevents surface defects on billets and final products derived therefrom in continuous casting.

17 Claims, 5 Drawing Figures

ADDITIVES FOR CONTINUOUS CASTING OF STEEL

BACKGROUND OF THE INVENTION

1. Field of the Invention

This invention relates to additives for molds for use in casting of steel. More particularly, this invention relates to additives for continuous casting which are added to the surface of a molten steel in a mold in order to prevent surface defects on billets and final products derived therefrom in continuous casting; the additives for continuous casting (hereinafter referred to simply as additives) permit the casting of economical, high quality billets, and final products having a high surface clean ability.

2. Description of the Prior Art

Generally, the characteristics required of this type of additive (continuous casting powder) include (1) that it has appropriate melting points, (2) that it has appropriate viscosity characteristics and slag fluidity, and the slag skin is not broken, (3) that it has appropriate basicities, and (4) that free CaO is not present because it promotes the formation of calcium aluminate and is thus undesirable.

Most known additives are multi-component mixtures of appropriate combinations of metal oxides such as $SiO_2$, $CaO$, $Al_2O_3$, $Na_2O$, $K_2O$, $B_2O_3$ and $Li_2O$ and with metal fluorides such as $CaF_2$, $NaF$, $LiF$ and $AlF_3$ contained therein. By adding these mixtures to the surface of a molten steel, they melt and serve various purposes, e.g., preventing the surface oxidation of the in-mold molten steel, insulating heat by blocking its radiation, absorbing scums floating on the surface of the molten steel, and, in continuous casting, imparting lubricating action between the steel and the mold.

These known multi-component mixtures usually comprise, for example, fly ash, glass powder, clay powder (perlite, diatomaceous earth, bentonite, etc.), portland cement, etc. as base materials added with flux components such as fluorides, borides, alkali carbonates, etc., carbon for adjusting the melting speed, and their compositions are roughly 30 to 50% $SiO_2$, 2 to 15% $Al_2O_3$, 20 to 50% $CaO$, 5 to 15% alkali oxides, and 2 to 10% of carbon materials, all by weight.

However, such prior art additives suffer from problems, such as (1) that the composition of base materials is complicated and the melting characteristics will vary widely according to changes in the kind of component in the composition or in the amounts thereof added, (2) that there occur surface defects of final products due to unevitable incorporation of calcium aluminate in base material components, and so forth.

Furthermore, with the prior art additives in which flux-forming components comprise several kinds of multicomponent mixtures, since when they are added to the surface of a molten steel, they undergo a two-stage reaction, i.e., initially sintering takes place, and subsequently the sintered product melts, the thermal change on the steel surface is great, and even in static casting such as top pouring casting, bottom pouring casting, etc., when the pouring speed is increased, the balance between sintering and melting may be lost, generating a sintered ingot, and thus sometimes blocking the operation. Still more, for continuous casting, in which an ingot is formed under a dynamic equilibrium condition, this equilibrium is extremely delicate, and it is therefore apt to cause problems. In continuous casting, in which the additive added flows between the mold and the solidified shell, and is withdrawn together with the steel, the height of the molten layer from the steel is determined mainly by the balance of the casting speed and the melting speed of the additive. If the melting speed is too rapid, all of the additive will melt, thus deteriorating the heat insulating effect, while if it is too slow, the molten layer will disappear, and it will intervene as a powder between the steel and the mold, thus causing defects on the steel surface. In an extreme case, the so-called break out phenomenon may occur; that is, the nonsolidified molten steel may flow out, which can sometimes render the operation impossible. Thus, especially for ingot formation in continuous casting, the effect of the additive is extremely important, and is very delicate with respect to the necessity of maintaining the dynamic equilibrium condition. For the reason the additive should not only be of a specified chemical composition, but also the chemical and physical properties of the additive must comply with extremely severe requirements.

On the other hand, as the demand for improving productivity of steel has become stronger, so-called high speed continuous casting, which is conducted at even higher speeds, has been attempted, and accordingly there has been an increasing demand for additives suitable for such process.

For example, while the drawing speed in ordinary continuous casting is from about 1 to 1.4 m/min., there is an increasing inclination toward the so-called high speed continuous casting operations conducted at about 1.8 m/min. or higher.

However, in order to increase producitivity by such continuous casting, the characteristics of the prior art additives are inadequate. The properties that are required for improved performance include lower viscosity, a higher film strength of the molten glass, and a lower surface tension (to have a greater ability to wet the molten steel). In complying with these requirements, various measures have been proposed, such as increasing amounts of Na, K, etc. added, increasing F content, etc. from the compositional aspect, and, for example, the use of pre-calcined starting materials in order to prevent retardation in melting due to sintering on the steel surface, heating starting materials to vitrify them, and so forth.

However, if the amount of Na, K, or the like added is increased, the molten ingot loses its vitreous properties and becomes easily crystallized, and the strength of the glass film is lowered, and hence becomes apt to generate surface defects of the steel. Furthermore, when the increased amounts of Na or K are added as the fluoride or carbonate, the amount of $SiF_4$ and $CO_2$ gases generate increases, due to its reaction with the silicate content and an autodecomposition reaction.

On the other hand, the proposals on the sintering treatment and melting treatment of additives not only still have room for improvement because of merits and demerits in controllability of the melting speed and heat insulating properties, but also because it is disadvantageous to employ such a production process for the limited production of each of multi-items. For additive manufacturers such individual sintering and melting treatments are not industrial, thus resulting in low productivity.

As a result of our intensive study on additives in view of the above situations, we have discovered base materials for additives which satisfy these requirements, and thus accomplished the present invention.

SUMMARY OF THE INVENTION

Accordingly, the invention is directed to an additive for continuous casting of steel comprising as a base material a neutral to basic amorphous fluorine-containing calcium silicate powder containing up to 10% by weight $R_2O_3$, wherein R represents Al and Fe, and up to 1.5% by weight of $P_2O_5$.

DETAILED DESCRIPTION OF THE INVENTION

The additives in accordance with the present invention comprise amorphous fluorine-containing calcium silicate as a base material, and the content of main components, CaO and $SiO_2$, and the molar ratio thereof imparts the fundamental properties, such as melting characteristics, viscosity, surface tension, etc. to the material. The F exerts a delicate influence on such properties, and can be present stably in amounts representing the quantitative relationship for the silicic acid molecule to combine therewith at an appropriate combination number; thus, although present only in a minor amount, the F is an essential effective component.

For the additives for continuous casting of steel which undergo a higher casting speed as compared with top pouring casting and bottom pouring casting, it is required that they possess a low viscosity as well as a low surface tension.

Figure 1:
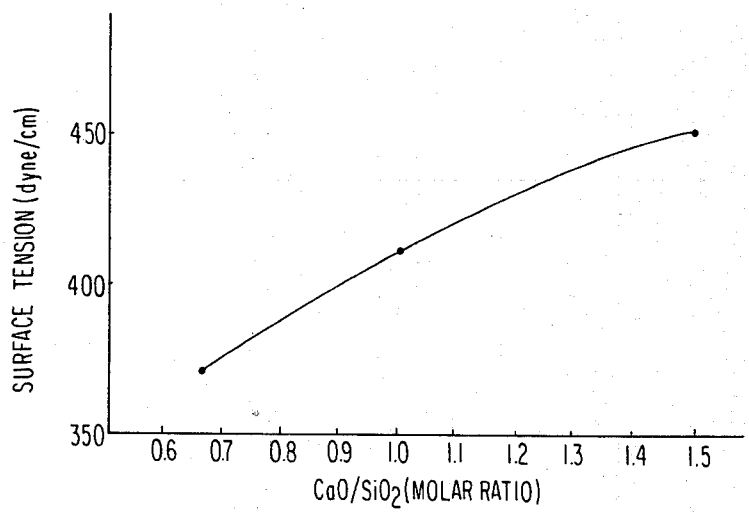
FIG. 1 is a graph showing the relationship of the molar ratio of CaO to $SiO_2$ with respect to the surface tension in the CaO-$SiO_2$ system at 1550° C.
Figure 2:
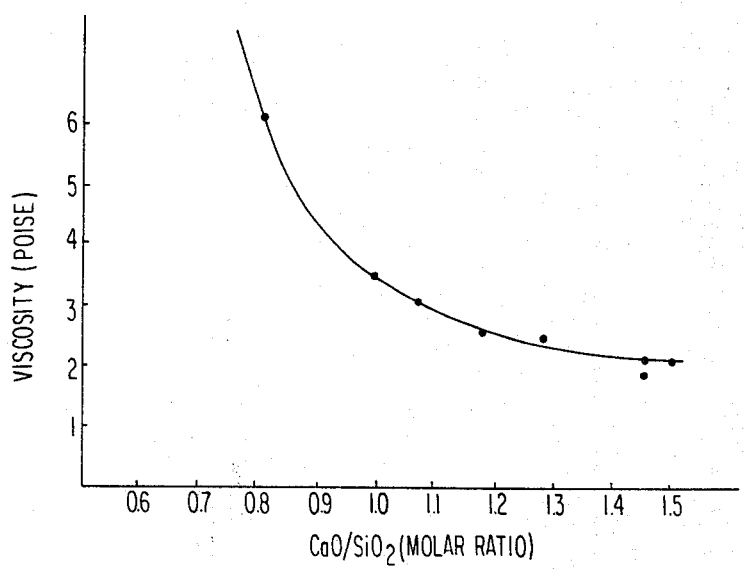
FIG. 2 is a graph showing the relationship of the molar ratio of CaO to $SiO_2$ with the viscosity in the CaO-$SiO_2$ system at 1550° C.

In this connection, by way of an example, attention is directed to the attached drawings. FIG. 1 is a graph showing the relationship of the molar ratio of CaO to $SiO_2$ with the surface tension in the CaO - $SiO_2$ system at 1550° C. and FIG. 2 is a graph showing the relationship of the molar ratio of CaO to $SiO_2$ with the viscosity in the CaO-$SiO_2$ system at 1550° C. In this system, when Ca is present in excess, the —Si—O—Si—O— chains in the molecule are shortened, thus lowering the viscosity, and it is thus easy to adjust to a specified viscosity. However, an increase in surface tension is observed at the same time. Other cations also exhibit similar tendencies. Therefore, it is difficult to obtain a composition having the desired viscosity and surface tension merely using such system.

However, if F is present in this system, in addition to the fact that it cuts the afore-mentioned chains, similar to cations such as Ca, to reduce the viscosity, since the contribution to the surface tension is 150 dyne/cm-.mole, i.e. 1/4 as compared with 600 dyne/cm.mole of Ca ion, the physical properties can be more precisely adjusted, and the melting characteristics of the composition of this system can also be favorably influenced.

Figure 3:
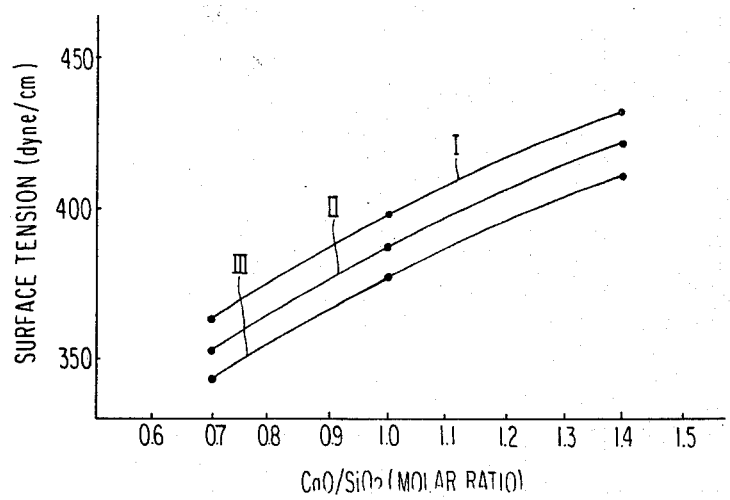
FIG. 3 and FIG. 4 are graphs showing the relationships of the molar ratio of CaO to $SiO_2$ with the surface tension and the viscosity, respectively, in the CaO-$SiO_2$-F system at 1550° C.
Figure 4:
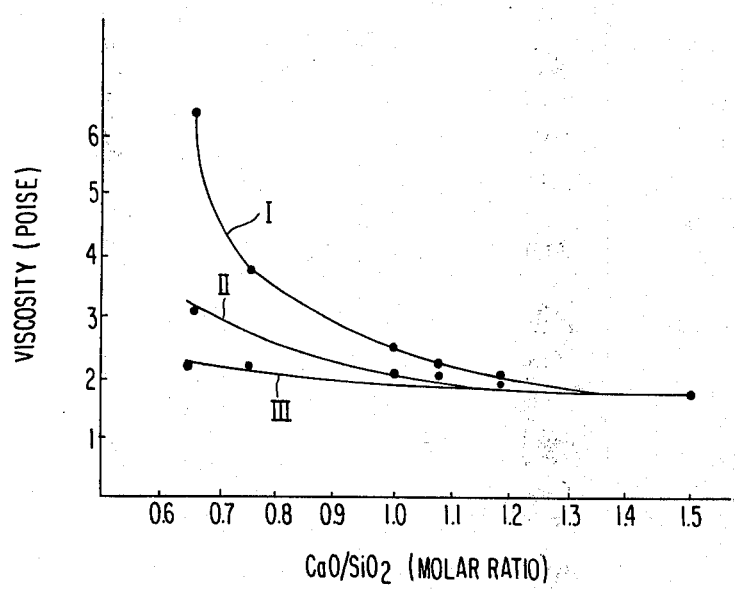
Figure 5:
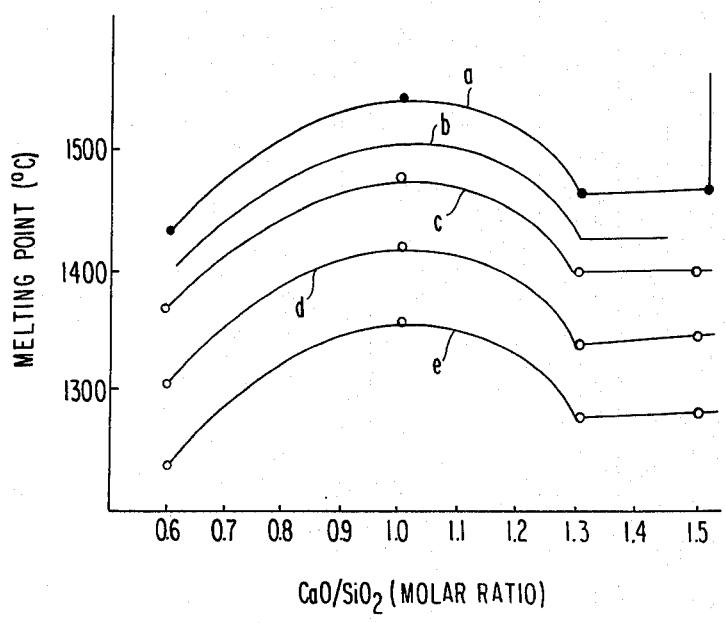
FIG. 5 is a graph showing the relationship of the molar ratio of CaO to $SiO_2$ with the melting temperature in the CaO-$SiO_2$-F system at 1550° C.

These facts are evident from the graphs given in FIGS. 3 to 5. The surface tension and viscosity were measured at 1550° C. in FIGS. 3 to 5. FIG. 3 and FIG. 4 are graphs showing the relationship of the molar ratio of CaO to $SiO_2$ with the surface tension and the viscosity, respectively, when the molar ratio of F to $SiO_2$ in the CaO-$SiO_2$-F system is changed to 0.1, 0.2 and 0.3 (indicated by I, II and III, respectively). FIG. 5 is a graph showing the relationship of the molar ratio of CaO to $SiO_2$ with the melting temperature in the CaO-$SiO_2$-F system where the molar ratio of F to $SiO_2$ is changed to 0.0, 0.05, 0.1, 0.2 and 0.3 (indicated by a, b, c, d and e, respectively).

As described above, while, for use as an additive, its composition must be determined according to the particular continuous casting conditions in consideration of the aforementioned relationships, it is essential that the base material have a lower melting point than that of steel, and that it be neutral to basic, and is generally based on basic calcium silicate which further contains fluorine. Therefore, with the base material, as expressed by the general formula xCaO.$SiO_2$.F, if the value x (i.e. molar ratio of CaO to $SiO_2$) is less than 1 the material is acidic and thus lacking in applicability as an additive, as well as tending to have a higher melting point, whereas if it exceeds 1.4, fine crystals of 2CaO.$SiO_2$ form during the quenching operation, resulting in a loss of vitreous properties. In most cases, the range of $1.05 \leq X \leq 1.30$ is especially preferred. The reason for that is that where x>1.3, the solubility of $Al_2O_3$ contained in cast iron into the additive is lowered, and it tends to form gehlenite type crystals with the $Al_2O_3$ contained in the additive. This is an influence of excess calcium. When calcium is further increased to a stronger basicity, the viscosity is reduced, the consequent reduction in vitreous properties and an increase in surface tension; all of these changes are unfavorable for the applicability as the additive. The limit for this is that x is approximately 1.4 with an exception discussed later. On the other hand, at the lower limit, especially when slag obtained from phosphorus production is employed as an additive, said slag must be weakly basic, at least so that x is 1.05 or more.

In the next place, in continuous casting, the viscosity of the additive employed is preferably in the range of 4 to 5 poise at 1400° to 1500° C., but for its high speed operation, the viscosity accommodating to the speed is required, and it is preferred at least to be less than the above value. For example, in certain high casting, a viscosity of the additive of 1.5 to 2 poise is considered appropriate, while where the drawing speed of steel is 2 m/min. or more, 1 poise in viscosity is considered suitable. Furthermore, since the surface tension at the same temperature must be be about 400 dyn/cm or less, it is essential that the F content, i.e. the value y (molar ratio of F to $SiO_2$) which is concerned with such physical properties as well as the melting point be equal to or more than 0.05 up to 1.5. If it exceeds about 1.5, adverse influences due to F such as a great change in surface tension, etc. will appear rather than expected effects by the F content. In other words, when y further becomes greater than the above value, F has a possibility of reacting with the $SiO_2$ component upon melting to generate $SiF_4$, thus causing various problems such as foaming, volatilization of the $SiO_2$ component and consequent environmental polution, generation of blow holes on ingot formation, and the like.

On the other hand, if an appropriate amount of fluorine component is present in the amorphous material, it stably influences various physical properties such as solubility, melting point, surface tension, viscosity, etc. and further exerts desirable effects, for example, it dissolves the oxides, sulfides in the molten steel in the molten additive. In most cases, y is preferably in the range of from 0.05 to 1.2 (i.e., $0.05 \leq y \leq 1.2$).

Thirdly, as a further component, $R_2O_3$, wherein R represents Al and Fe, is contained in an appropriate amount as an effective component in said fluorine-containing calcium silicate. The reason is that $Al_2O_3$ in the additive possesses an ability to absorb $Al_2O_3$ in the molten steel on casting into the slag layer, and thus the $R_2O_3$ content confers a great influence on the cleaning action on the steel by said absorbing ability. On the other hand, however, when the additive comes into contact with the molten steel surface to form the slag layer, a consolidated shell (hereinafter referred to as "slag bear") is formed at the contacted site of the water-cooled mold and the slag layer, and if the $Al_2O_3$ content is high, crystals of gehlenite ($2CaO.Al_2O_3.SiO_2$) and anorthite ($CaO.Al_2O_3.2SiO_2$) start to separate, depending on the molar ratio of CaO to $SiO_2$, and form a high melting point deposit. Such deposit peels off from the mold surface and descends, being caught between the molten steel surface and the water-cooled mold surface, thus forming skin defects of the slag surface the so-called "slag occlusion" phenomenon) and in extreme cases, can block the operation. Since these components form a matrix which widely varies the viscosity, the reasons for addition of an appropriate amount of the components are, for example, to impart versatility to the properties of the additive, thereby enhancing applicability as an additive, and to serve other various purposes.

Therefore, in view of the foregoing, it is required that $R_2O_3$ be present in an amount of up to 10% by weight in said fluorine-containing calcium silicate, and preferably in an amount from about 1 to 8% by weight.

In addition, depending on the situation of starting materials, more or less impurities are present, which is acceptable as long as it does not adversely affect the properties of the additive. However, although phosphorus and sulfur components are preferably as small as possible if present as other impurities, the additives in accordance with the present invention can tolerate the presence of such impurities in amounts of up to 1.5% by weight calculated as $P_2O_5$, without substantially any adverse effect.

In the present invention, the base material, which is the specific fluorine-containing calcium silicate described above, must be amorphous. The reason for that is based on experimental results, and the crystalline form is not suitable even if it has the same composition. For example, the additive prepared using a crystalline material of a certain composition as a base material brings about a change in the microscopic structure when it melts, and also causes fly ash, etc., thus making it difficult to maintain the uniform compositional condition as intended. This is also true with the additive obtained by mixing respective starting materials to the desired composition, and $Na_2O$, F, etc. is evaporated upon melting, and as a result the melting characteristics are remarkably deteriorated due to the fluctuation in composition.

These things are especially important in continuous casting, in which the influences by the melting speed reflect strongly, and thus it is one of great features of the additives in accordance with the present invention to adapt to high speed casting. In addition, it is required of the additives to melt at the meniscus shell forming temperature of the molten steel and form a uniform film layer. From this point of view, the crystalline material is unsuitable, because of the tendency to give a difference in melting point and melting speed, and in continuous casting aiming the dynamic balance the vitreous material which is homogenized in composition by quenching is much more effective in the prevention of surface defects of steel.

While the amorphous fluorine-containing calcium silicate as the base material in the additive may be obtained industrially by various production processes, a slag byproduced when yellow phosphorus is produced from reducing materials such as phosphorus rock, silica, coke, etc. (hereinafter referred to as phosphorus production slag) may be employed as such, and therefore it constitutes one of the features of the present invention. As described above, said slag contains from 0.5 to 5% by weight of phosphorus calculated as $P_2O_5$ in nature, and since phosphorus naturally reduces the steel strength, its inclusion is desirably avoided. On the contrary, with the additives in accordance with the present invention, migration of phosphorus in the additive into the molten steel does not occur, but, surprisingly enough, it has been discovered that phosphorus in the molten steel rather migrates into the molten additive, i.e. dephosphorization occurs.

This phenomenon is not observed with the crystalline phosphorus production slag of the same composition and the phosphorus impurity migrates into the molten steel. For example, amorphous and crystalline phosphorus production slags shown in Table 1 were employed to coat steel ($P_2O_5$: 0.01%, C: 0.09%) in the same amounts, melted in an electric furnace, and measured for $P_2O_5$ in the molten steel after a certain period of time. The results are given in the right end column in Table 1.

TABLE 1

| Slag | X-ray Diffraction pattern | (all % by weight) | | | | | | | $P_2O_5$ in Molten Steel |
| --- | --- | --- | --- | --- | --- | --- | --- | --- | --- |
| | | $P_2O_5$ | CaO | $SiO_2$ | $Fe_2O_3$ | $Al_2O_3$ | S | F | |
| A | Amorphous | 0.75 | 48.5 | 43.9 | 0.3 | 2.9 | 0.3 | 2.0 | 0.006 |
| B | Amorphous | 1.58 | 49.5 | 43.7 | 0.3 | 2.6 | 0.3 | 2.1 | 0.007 |
| C | Crystalline | 0.75 | 48.5 | 43.9 | 0.3 | 2.9 | 0.3 | 2.0 | 0.017 |

This is one example, and thus when the phosphorus production slag is amorphous and the $P_2O_5$ content is about 1.5% by weight or less, the contamination of steel by phosphorus in continuous casting is not observed, in accordance with the experimental observations. Although the reason for that is not clearly understood, it is believed that since the composition is extremely uniform because of its vitreous state, since the bond chains of the $SiO_2$ molecules are randomly arranged and phosphorus is caught by the —Si—O—Si— network molecules, there results inhibition of migration thereof to the steel, and further, since the composition is weakly basic, reaction between the phosphorus in the molten steel and the base material occurs.

On the other hand, even in the same composition, the crystalline phosphorus production slag obtained by gradual cooling contains mixed crystals such as of $CaSiO_3$, $Ca_2SiO_2F_2$, $Ca_3Si_2O_7$, $Ca(PO_4)_2CaF_2$, etc. and is considered to form with the molten steel an equilibrium condition different from that of the vitreous material with the molten steel.

Although phosphorus production slag varies in composition from its nature depending on the situation of starting materials such as phosphorus rock, silica, etc. and the production conditions of yellow phosphorus, generally with its composition expressed as $xCaO.SiO_2.yF$, x is in the range of 0.8–1.2 and y is in the range of 0.05–0.3 and the content of $R_2O_3$ is 4% by weight or less. Therefore, it is possible, as an alternative embodiment of production, to produce a slag having the desired composition as a by-product while effectively producing yellow phosphorus according to the present invention, as described below.

More particularly, on producing yellow phosphorus by heating and melting mixtures of phosphorus rock, silica, carbon materials such as coke, etc., yellow phosphorus and the desired additive can be produced at the same time with a low consumption of energy by adding an aluminum-containing material together with a fluorine-containing material.

In Japan, the compositions of slags produced as a by-product in conventional processes for producing yellow phosphorus mainly comprise weakly basic fluorine-containing calcium silicate from a standpoint of their utilization as fertilizers, and because they have high melting points, they are presently being treated in a reducing atmosphere at about 1500° C. or higher. It is said that the temperature for the reducing reaction to dephosphorize phosphorus rock is theoretically much lower than the above temperature, and probably around 1200° C. as described in John R. Van Wazer, *Phosphorus and Its Compounds* vol. 2 p. 1174 (1961) and Wim H. Waggamann, *Phosphoric Acid, Phosphates and Phosphatic Fertilizers* 2nd ed. p. 135 (1952). Therefore, the heat energy is almost exclusively consumed to melt the high melting point slag. In such yellow phosphorus production, when the starting materials are further mixed with an aluminum-containing material and a fluorine-containing material, the melting point of the slag is remarkably lowered and yellow phosphorus can be produced without reducing the yield with saving energy.

In addition, the slag produced as a by-product (also referred to as the "byproduced slag") is calcium silicate of higher contents of aluminum and fluorine as compared with conventional slags, thus having the composition and physical properties suitable as the additive.

The aluminum-containing material to be added is not limited as long as it is $Al_2O_3$, $Al_2O_3$—$SiO_2$ type or CaO—$Al_2O_3$—$SiO_2$ type material from the nature of mixtures of starting materials. Examples of such material include feldspar, perlite, alumina cement, bauxite, vermiculite, sillimamite, zeolite, alunite, kaolin, etc. They may be used alone or in combination. The fluorine-containing material may be, for example, fluorite, cryolite, aluminum fluoride or the like. Although fluorine is usually contained in phosphorus rock, the feature of the present invention resides in positively adding the fluorine content together with the aluminum content, thereby greatly reducing the melting point of the slag as well as imparting the specific viscosity and surface tension. The amounts of these added can vary depending on the situation of phosphorus rock and other starting materials, the melting point and viscosity of the slag, the applicability of the slag as the additive for steel production, but in most cases, no problems are encountered in adjusting the slag composition within the above range. As can be expected from the above description, the present invention has an advantageous feature that phosphate-alumina rock can also be employed as a starting material. Said rock was virtually of no utility in conventional processes and the starting material phosphorus rock was exclusively limited to the apatite type phosphorus rock. It is because, when the utilization of the byproduced slag as a fertilizer is contemplated, the slag of a greater $Al_2O_3$ content is not suitable as a starting material for phosphatic fertilizers since the content reduces the effective phosphoric acid in soil. However, in the present invention, since phosphorus and alumina can be advantageously utilized, such rock can be preferably used as a suitable starting material and thus developing a new way to the effective utilization of the heretofore undesired rock as a starting material for yellow phosphorus production.

In the next place, while the slag byproduced in the present invention is in itself that favorably modified so as to adapt to the additive for continuous casting in steel production, it is, if necessary, sometimes preferable to include an alkali content such as $Na_2O$. In such case, since the addition of the alkali component to yellow phosphorus production leads to reduction in yellow phosphorus yield or contamination, the amount should not exceed about 2% by weight based on the starting material. Therefore, when the alkali content is required in using said slag as the additive, it is of course contemplated to mix other alkali agent but it is preferred to add a desired amount of an alkali agent to the molten slag withdrawn from yellow phosphorus production to make a uniform composition containing the necessary alkali content. Examples of such alkali agent are soda ash, refuse glass, alkali silicate, etc., and particularly from an operational point of view vitreous materials are suitable. In this case, the amount of the alkali agent added must be at most 0.4 mole calculated as $M_2O$ (wherein M is Na or K) per mole of $SiO_2$ in the slag.

Such slag must be of an amorphous structure and can be produced by granulation by quenching with water. As described above, the crystalline slag produced by gradual cooling has no aptitude as an additive for casting, whatever composition it has.

Although the afore-mentioned phosphorus production slag produced by either way may be effectively employed as a base material for the additive and is most advantageous from an industrial point of view with a consideration of the starting material situation, the neutral to weakly basic amorphous fluorine-containing calcium silicate in accordance with the present invention may also be provided as a synthesized product from a silicic acid-containing material, a calcium-containing material and a fluorine-containing material, and in this case, since the product has less contents of phosphides, sulfides, sulfates, etc., a more excellent additive can be obtained.

The synthesized product is produced by mixing a silicic acid-containing material, a calcium-containing material and a fluorine-containing material in proportions, such that the product composition falls within the above range, melting the preparation in an electric oven, and subsequently quenching it with water to effect granulation. Examples of the silicic acid-containing material include silica, silica sand, etc., those of the calcium-containing material include lime stone, unslaked lime, slaked lime, calcium silicate or various electric heating metallurgic slags based on these material, and those of the fluorine-containing material include fluorite, sodium fluoride, etc.

Unlike static casting such as top pouring casting and bottom pouring casting, continuous casting imposes severe physical and chemical requirements on the additive, viz., to have constantly stable viscosity and surface tension in the dynamic equilibrium condition depending on the kind of steel and the change in casting speed, and to have other appropriate properties as an additive. The fluorine-containing calcium silicate in accordance with the present invention must be adjusted to an appropriate range of particle size. The powder having a particle size in the range of from 2000 to 3500 cm$^2$/g measured as the specific surface area by Blaine permeameter is especially preferred. When it is less than 2000 cm$^2$/g, powders having uniform composition cannot be obtained so that the powders do not melt homogeneously. On the other hand, the use of powders having the specific surface area of more than 3500 cm$^2$/g adversely affects the workability due to dusting and is not economical. In most cases, it is used as the powder but it is sometimes used as granules of from 1 to 2 mm, in order to prevent dusting on use.

The additives in accordance with the present invention may be produced by mixing the base material comprising as an effective component the afore-mentioned amorphous fluorine-containing calcium silicate with flux components such as soda ash, sodium fluoride, sodium silicate, etc. as an alkali agent, and carbon such as coke, graphite, etc. as an melting speed modifier and for maintaining the reducing atmosphere for the molten steel in desired amounts respectively.

However, in the ingot forming operation, to add 5% or more of carbon inevitably involves a cementing effect, and therefore in the case where the cementation is not wanted in the desired kind of steel, the amount added is preferably as small as possible, with an upper limit of 5%. The mixing ratio on this occasion is generally such that, based on the total weight of the additive, the amorphous fluorine-containing calcium silicate compound (base material) is in the range of 60–90% by weight; the flux components such as alkali agents are in the range of 5–35% by weight; and carbon is in the range of 1–5% by weight. And, if necessary, it is preferred to pelletize the composition in order to prevent the deterioration of working environment due to separation or dusting of the composition components on use, and generally it is pelletized into granules of from 0.5 to 4 mm, and preferably from 0.5 to 2 mm, in diameter, using water or an aqueous alkali silicate solution as a binder.

In addition, in the additives in accordance with the present invention, when a powder of alkali silicate glass, soda lime glass, etc. (both preferably being in the afore-mentioned particle size range) is used as an alkali agent, the resulting additives are particularly preferred.

The alkali silicate glass to be used in the present invention is the starting material for producing dry process water glass, and generally it is sodium silicate cullet powder having a molar ratio of SiO$_2$/M$_2$O (wherein M is Na or K) of from 1/1 to 4/1, and preferably from 1.5/1 to 3/1. Alternatively, it is possible to use soda lime glass powder instead of alkali silicate glass, or to use combination with said glasses.

The mixing proportion of the base material and the alkali silicate glass, although varying depending on the casting conditions, the difference in modifying components added, etc., must be in the range such that the resulting blend product has a molar ratio composition of (0.1 to 0.3)M$_2$O.(0.6 to 1.5)CaO.SiO$_2$. (0.1 to 1.0)F wherein M is as defined above. In the additives in accordance with the present invention, the suitable flux composition is thus specified in a consideration of the temperature when the mixture has melted and the various properties of the melted mixture, such as melting point, viscosity, surface tension, and so forth.

Thus, when an additive in accordance with the present invention is added to the surface of molten steel, it dissolves uniformly in the molten metal, complies with the fluctuation of the molten metal surface (i.e., spreading, rippling) without causing sintering, and its heat insulating effect is excellent, as well as its absorption of scums.

A billet thus obtained is beautiful, without surface defects, and operational trouble is virtually nil. In order to conduct a series of process connecting continuous casting and rolling steps, it is said necessary to hold down the percent of surface defect generation to 0.5% or less, and such additive can also satisfy this requirement.

While the additives in accordance with the present invention are based on slag components of perfectly amorphous glass and are easily compliant with the movement of molten steel in continuous casting without changing the basic composition, it is possible, as mentioned before, to present a monolayer type additive in which all the components are present homogeneously in the vitreous state if it is desired to attain uniformity of the composition, and further, as mentioned before, a mixed type additive of two kinds of glass can also be easily provided. Thus, by using the additives in accordance with the present invention, various severe operational conditions for continuous casting of steel can be easily satisfied and steel can be produced advantageously from an industrial viewpoint.

The present invention is more particularly described by the following examples.

EXAMPLE 1

A slag shown in Table 2 which had been produced by pouring water over a molten metal produced from a yellow phosphorus producing furnace thereby quenching and solidifying was ground to obtain an amorphous fluorine-containing calcium silicate (1.18 CaO.SiO$_2$. 0.148 F) powder having a Blaine value of 2600 cm$^2$/g and a percent pass through 147$\mu$ sieve of 92%. Eighty parts by weight of this product was mixed with 13 parts by weight of sodium carbonate, 4 parts by weight of sodium fluoride and 3 parts by weight of carbon and pelletized into granules of 0.5–2 mm in diameter using a sodium silicate solution followed by drying. An additive for continuous casting was thus produced.

This product was used to add to a mold in continuous casting of aluminum killed steel (drawing speed: 1.8 m/min) in an amount of 0.5 kg/t steel. The results are shown in Table 5 along with those of conventional products for comparison.

TABLE 2

Analytical Data of Phosphorus Production Slag

| Component | Content |
|---|---|
| CaO | 48.45% |
| $SiO_2$ | 43.93% |
| $Fe_2O_3$ | 0.26% |
| $Al_2O_3$ | 2.92% |
| F | 2.05% |
| S | 0.3% |
| $P_2O_5$ | 0.7% |

EXAMPLE 2

81.2 parts by weight of lime stone, 45.6 parts by weight of quartzite and 5.3 parts by weight of fluorite were mixed and melted by heating to 1500° C. in an electric furnace. The compositions of lime stone, quartzite and fluorite used herein are shown in Table 3.

The molten metal was poured with water to quench and solidify thus obtaining amorphous fluorine-containing calcium silicate ($1.24CaO \cdot SiO_2 \cdot 0.15$ F) having the composition shown in Table 4. It was ground into a powder of a Blaine value of 2,700 $cm^2/g$ and a percent pass through 147μ sieve of 90%. 80 Parts by weight of this product was mixed with 13 parts by weight of sodium carbonate, 4 parts by weight of sodium fluoride and 3 parts by weight of carbon and pelletized into granules of 0.5–2 mm in diameter using a sodium silicate solution, followed by drying. The results obtained when used similarly as in Example 1 are shown in Table 5.

TABLE 3

| | \(% by weight\) | | | | | |
|---|---|---|---|---|---|---|
| | CaO | $SiO_2$ | F | $Al_2O_3$ | $Fe_2O_3$ | S |
| Lime Stone | 55.06 | 2.08 | — | 0.02 | 0.07 | 0.01 |
| Quartzite | 1.01 | 93.8 | — | 3.32 | 0.81 | 0.01 |
| Fluorite | 72.5 | 0.81 | 47.5 | — | — | — |

TABLE 4

| Component | Content (%) |
|---|---|
| CaO | 49.87 |
| $SiO_2$ | 43.62 |
| $Fe_2O_3$ | 0.63 |
| $Al_2O_3$ | 3.24 |
| F | 2.09 |
| S | 0 |
| $P_2O_5$ | 0 |

TABLE 5

Test Results

| | Characteristic Value | |
|---|---|---|
| Kind of Additive | Billet* Properties (No./$m^2$) | Percent** Generation of Defects |
| Additive based on wollastonite (crystalline) | 14.5 | 0 |
| Commercial product based on fly ash, cement, etc. | 11.2 | 15 |
| Product of Example 1 of the Invention (phosphorus production slag) | 0.6 | 0 |
| Product of Example 2 of the Invention (synthesized product) | 0.4 | 0 |

Note:
*The number of surface defects per square meter of billet product after cold scarfing.
**The percentage of defect products due to calcium aluminate found in billet products.

EXAMPLE 3

As shown in Table 6, mixtures, each obtained from amorphos fluorine-containing calcium silicate and a sodium fluoride or sodium silicate powder, were added with minor amounts of carbon and pelletized using a water glass solution to prepare additives of 1 to 2 mm in diameter.

Using the respective additives, continuous casting of aluminum killed steel was conducted at a drawing speed of 1.8 m/min. to obtain the results shown in Table 7.

For comparison, two additives, each based on a crystalline fluorine-containing silicate, were also tested and the results are given in the same Table.

The amorphous fluorine-containing calcium silicate (A) used as the base material was prepared by mixing specified amounts of lime stone, silica sand, calcium fluoride, aluminum silicate and blast furnace slag, completely melting the resulting mixture by heating in a closed electric furnace and granulating, followed by drying and grinding.

TABLE 6

| Composition of Starting Materials (molar ratio) | | Mixing Ratio of | | |
|---|---|---|---|---|
| Fluorine-containing Calcium Silicate (A) | Soda Salt (A) | A to B (by weight) | Composition of Mixture (molar ratio) | Note |
| Present Invention | | | | |
| 1. $1.2CaO \cdot SiO_2 \cdot 0.4F$ (4% $R_2O_3$ contained) | NaF | 8.5:1 | $0.2Na_2O \cdot 1.2CaO \cdot SiO_2 \cdot 0.8F$ | A and B: 100 mesh pass on 92–95%, and specific surface area of 2500–2800 $cm^2/g$ measured by Blaine permeameter |
| 2. $1.2CaO \cdot SiO_2 \cdot 0.6$ F (3.8% $R_2O_3$ contained) | $Na_2SiO_3$ | 5.9:1 | $0.17Na_2O \cdot CaO \cdot SiO_2 \cdot 0.5F$ | |
| 3. $1.2CaO \cdot SiO_2 \cdot 0.8F$ (4.2% $R_2O_3$ contained) | NaF | 17.8:1 | $0.1Na_2O \cdot 1.2CaO \cdot SiO_2 \cdot 1.0F$ | |
| Comparative Examples | | | | |
| 1. A mixture of 80 parts crystalline fluorine-containing calcium silicate ($1.2CaO \cdot SiO_2 \cdot 0.18F$), 8 parts of sodium fluoride and 4 parts of alumina, added with a minor amount of carbon and pelletized into 1–2 mm with a water glass solution. | | | $0.3Na_2O \cdot 1.2CaO \cdot SiO_2 \cdot 0.5F$ | Both mixtures: 100 mesh pass of 95% or more |
| 2. A mixture of 70 parts of synthesized wollastonite (crystalline), 13 parts of sodium fluoride, 10 parts of alumina cement and | | Same as the above | | |

TABLE 6-continued

| Composition of Starting Materials (molar ratio) | | Mixing Ratio of | | |
|---|---|---|---|---|
| Fluorine-containing Calcium Silicate (A) | Soda Salt (A) | A to B (by weight) | Composition of Mixture (molar ratio) | Note |
| 4 parts of unslaked lime similarly pelletized. | | | | |

TABLE 7

| Additive | Billet Properties (No./m²) | Percent Generation of Defects |
|---|---|---|
| 1 | 0.1 | 0.5 |
| 2 | 0.3 | 1 |
| 3 | 0.3 | 0.9 |
| Comparative Example 1 | Many surface defects | |
| Comparative Example 2 | Operation impossible due to excess vertical crackings and surface defects | |

TABLE 9

| | No. | Molar Composition | $R_2O_3$ Content (% by weight) |
|---|---|---|---|
| Product of the Invention | 1 | $1.2CaO \cdot SiO_2 \cdot 0.4F$ | 4.0 |
| | 2 | $1.2CaO \cdot SiO_2 \cdot 0.6F$ | 3.8 |
| | 3 | $1.2CaO \cdot SiO_2 \cdot 0.8F$ | 4.2 |
| Comparative Examples | 1 | $0.9CaO \cdot SiO_2 \cdot 0.5F$ | 4.8 |
| | 2 | $1.5CaO \cdot SiO_2 \cdot 1.0F$ | 3.7 |

TABLE 10

| Additive | | Starting Materials, Mixing | | Ratio of A:B (wt) | Composition of Mixture (molar ratio) |
|---|---|---|---|---|---|
| | | (A) | Soda Salt (B) | | |
| Product of the Invention | 1 | Flourine containing calcium silicate | NaF | 8.4:1 | $0.2Na_2O \cdot 1.2CaO \cdot SiO_2 \cdot 0.8F$ |
| | 2 | | $Na_2SiO_2$ | 5.9:1 | $0.17Na_2O \cdot CaO \cdot SiO_2 \cdot 0.5F$ |
| | 3 | | NaF | 17.7:1 | $0.1Na_2O \cdot 1.2CaO \cdot SiO_2 \cdot 1.0F$ |
| Comparative Examples | 1 | | NaF | 8.8:1 | $0.16Na_2O \cdot 0.9CaO \cdot SiO_2 \cdot 0.82F$ |
| | 2 | | $Na_2SiO_3$ | 5.6:1 | $0.19Na_2O \cdot 1.2CaO \cdot SiO_2 \cdot 0.8F$ |

TABLE 11

| Additive | | Billet Properties (No./m²) | Percent Generation of Defects |
|---|---|---|---|
| Product of the Invention | 1 | 0.10 | 0.5 |
| | 2 | 0.12 | 0.7 |
| | 3 | 0.10 | 0.6 |
| Comparative Examples | 1 | 0.95 | 2.0 |
| | 2 | 1.03 | 2.0 |

TABLE 12

| | (% by weight) | | | |
|---|---|---|---|---|
| | CaO | $SiO_2$ | $Al_2O_3$ | F |
| Lime Stone | 54.1 | 0.2 | 0.1 | — |
| Unslaked Lime | 92.4 | 1.7 | 0.3 | — |
| Silica | 0.7 | 91.6 | 3.7 | — |
| Blast Furnace Slag | 44.8 | 32.7 | 14.3 | — |
| Aluminum Silicate | — | 40.5 | 45.2 | — |
| Fluorite | 57.5 | 12.5 | 0.1 | 36.5 |

EXAMPLE 4

Respective starting materials having the compositions shown in Table 12 were mixed in proportions given in Table 8, melted in an arc furnace of 30 KVA and 20 cm in inner diameter, granulated, dried and ground to obtain amorphous fluorine-containing calcium silicates of a specific surface area of 3000 cm²/g measured by Blaine permeameter having the compositions shown in Table 9. Further, soda salts were added in mixing ratios shown in Table 10 and, after addition of 4% of carbon, the respective mixtures were pelletized using a water glass solution to granules of 1-2 mm.

For comparison, additives containing the fluorine-containing calcium silicate beyond the composition specified in the present invention were similarly prepared.

Using these additives, continuous casting of aluminum killed steel was conducted at a drawing speed of 1.8 m/min. to obtain the results shown in Table 11.

TABLE 8

| | (% by weight) | | | | |
|---|---|---|---|---|---|
| | Product of the Invention | | | Comparative Examples | |
| | 1 | 2 | 3 | 1 | 2 |
| Lime Stone | 41.8 | 36.6 | 31.6 | 30.3 | 34.7 |
| Quartzite | 43.5 | 41.8 | 40.1 | 48.9 | 34.2 |
| Fluorite | 14.7 | 21.6 | 28.3 | 20.8 | 31.1 |

EXAMPLE 5

1000 Parts of phosphorus rock, 268 parts of quartzite, 195 parts of coke, 180 parts of fluorite and 354 parts of anorthite were mixed and melted in an electric furnace for yellow phosphorus production to obtain 157 parts of yellow phosphorus. The compositions of phosphorus rock, quartzite, coke, fluorite and anorthite used herein are shown in Table 13.

On the other hand, a part of the byproduced slag was directly granulated, while to 1000 parts of the rest of the molten product was added 41 parts of sodium silicate glass having the composition shown in Table 13, uniformly melted and granulated, thereby obtaining Slag A and Slag B shown in Table 14, respectively. The electric power consumed for obtaining b 157 parts of yellow phosphorus above was 2100 KWH.

For comparison, 1000 parts of phosphorus rock 486 parts of quartzite and 195 parts of coke were mixed and similarly melted by a conventional general process to obtain 158 parts of yellow phosphorus, and at the same time, 1100 parts of granulated Slag C was obtained. The consumed electric power this time was 2354 KWH, and therefore the former case was able to greatly reduce energy cost.

Then, the respective slags thus obtained (Table 14) were ground to 100 mesh or less using a tube mill, mixed with a mixture of starting materials shown in Table 15 in a V-shaped mixer, pelletized into granules of 1-2 mm to present additives for continuous casting, respectively. The mixing composition (molar ratio) was the same as that of Slag B of Table 14 except coke.

TABLE 13

| Starting Material | Component (%) | | | | | | |
|---|---|---|---|---|---|---|---|
| | $P_2O_5$ | CaO | $SiO_2$ | $Al_2O_3$ | $Na_2O$ | F | C |
| Phosphorus Rock | 37.0 | 53.4 | 1.8 | 0.4 | 0.45 | 3.5 | — |
| Quartzite | — | 1.7 | 92.1 | 4.5 | — | — | — |
| Coke | — | 0.3 | 6.5 | 3.5 | — | — | 86.5 |
| Fluorite | — | 57.5 | 12.5 | — | — | 36.5 | — |
| Anorthite | — | 0.4 | 65.1 | 19.0 | 4.62 | — | — |
| Sodium Silicate | — | — | 32.4 | — | 63.2 | — | — |

TABLE 14

| Slag No. | Component (%) | | | | | Composition of Mixture (molar ratio) |
|---|---|---|---|---|---|---|
| | CaO | $SiO_2$ | $Al_2O_3$ | $Na_2O$ | F | |
| A | 46.5 | 38.3 | 6.5 | 1.0 | 7.3 | $1.30CaO \cdot SiO_2 \cdot 0.1Al_2O_3 \cdot 0.03Na_2O \cdot 0.6F$ |
| B | 44.0 | 37.6 | 6.1 | 4.0 | 6.9 | $1.25CaO \cdot SiO_2 \cdot 0.1Al_2O_3 \cdot 0.1Na_2O \cdot 0.6F$ |
| C | 49.5 | 44.5 | 2.5 | 0.8 | 2.5 | $1.19CaO \cdot SiO_2 \cdot 0.03Al_2O_3 \cdot 0.02Na_2O \cdot 0.2F$ |

TABLE 15

| Mold Additives for Steel Production | Starting Materials |
|---|---|
| A | 100 parts of Slag A, 4 parts of sodium silicate* and 3 parts of coke |
| B | 100 parts of Slag B and 3 parts of coke |
| C | 100 parts of Slag C, 4 parts of sodium fluoride, 10 parts of calcium fluoride, 5 parts of alumina and 4 parts of coke |

Note
*Sodium silicate was the same as that in Table 13.

These additives were used in amounts of 0.5 kg/t-steel, and continuous casting of low-carbon aluminum killed steel was conducted, respectively, to obtain the results shown in Table 16.

TABLE 16

| Additive No. | Billet Properties (No./m²) | Percent Generation of Defects |
|---|---|---|
| A | 0.01 | 0.05 |
| B | 0.01 | 0.01 |
| C | 0.5 | 3 |

EXAMPLE 6

150 Parts of phosphate alumina rock shown in Table 17 was mixed with 850 parts of phosphorus rock, 450 parts of quartzite, 190 parts of coke and 140 parts of fluorite as shown in Table 13, and melted in an electric furnace for producing yellow phosphorus to obtain 156 parts of yellow phosphorus. The electric power consumed for this was 2150 KWH and as compared with conventional processes a remarkable reduction in electricity cost was accomplished.

On the other hand, a part of the byproduced slag was directly granulated, while a part of the rest of the molten product was mixed with 41 parts per 1000 parts of the molten product of sodium silicate glass and uniformly melted followed by granulating. The analytical data of the directly granulated slag are shown in Table 18 as Column A' and that of the sodium silicate-added slag are shown therein as Column B'. These are mixed with other starting materials similarly as in Example 5 to obtain additives for continuous casting, respectively. The respective additives were tested in continuous casting under the same conditions as in Example 5 to obtain good casting results similar to those obtained in Example 5 almost without significant difference from A and B shown in Table 16 respectively.

TABLE 17

| Analytical Date of Phosphate Alumina Rock | |
|---|---|
| $P_2O_5$ | 30.51% |
| CaO | 9.93 |
| $SiO_2$ | 1.48 |
| $Al_2O_3$ | 32.00 |
| F | 0.85 |
| $Fe_2O_3$ | 7.83 |

TABLE 18

| Analytical Item | Slag Composition (% by weight) | |
|---|---|---|
| | Slag A' | B' |
| CaO | 46.3 | 44.1 |
| $SiO_2$ | 38.2 | 37.4 |
| $Al_2O_3$ | 6.5 | 6.0 |
| $Na_2O$ | 1.1 | 4.2 |
| F | 7.1 | 6.6 |

EXAMPLE 7

Each mixture of amorphous fluorine-containing calcium silicate and soda-lime glass powders shown in Table 19 was mixed with a minor amount of carbon and pelletized using a water glass solution to obtain an additive of 1-2 mm in diameter. Each additive thus obtained was used in an amount of 0.5 kg/t in continuous casting of low-carbon aluminum killed steel to obtain the results shown in Table 20.

TABLE 19

| Additive | Composition of Starting Materials (molar ratio) | | Mixing Ratio of A to B (by weight) | Composition of Mixture (molar ratio) | Note |
|---|---|---|---|---|---|
| | Fluorine-containing Calcium Silicate (A) | Soda-lime Glass (B) | | | |
| Invention | | | | | |
| 1. | 1.2CaO . SiO$_2$ . 0.7F (5% R$_2$O$_3$ contained) | Na$_2$O . 0.4CaO . SiO$_2$ | 7:3 | 0.3Na$_2$O . 0.96CaO . SiO$_2$ . 0.5F | A and B: 100 mesh pass of 92–95%, and specific surface area of 2500–2800 cm$^2$/g measured by Blaine permeameter |
| 2. | 1.2CaO . SiO$_2$ . 1.2F (4.6% R$_2$O$_3$ contained) | Na$_2$O . 1.2CaO . 2SiO$_2$ | 6:1 | 0.28Na$_2$O . 0.88CaO . SiO$_2$ . F | |
| 3. | 1.4CaO . SiO$_2$ . 1.5F (4.2% R$_2$O$_3$ contained) | Na$_2$O . 0.5CaO . 3SiO$_2$ | 8:2 | 0.14Na$_2$O . 0.8CaO . SiO$_2$ . 0.86F | |

Note:
1. The vitreous fluorine-containing calcium silicate used in Product Nos. 1 and 2 of the invention is a granulated slag byproduced when producing yellow phosphorus by mixing specified amounts of phosphorus rock (P$_2$O$_5$: 36.5%, CaO: 52.3%, F: 3.5%), quartzite (R$_2$O$_3$: 7.7%), fluorite (R$_2$O$_3$: 3.6%) and coke and melting in an electric furnace.
2. The vitreous fluorine-containing calcium silicate used in Product No. 3 of the present invention is a synthesized product obtained by mixing specified amounts of lime stone, quartzite and fluorite, melting in an electric furnace and granulating similarly.

TABLE 20

| Additive | Billet Properties (Nos./m$^2$) | Percent Generation of Defects |
|---|---|---|
| Present Invention | | |
| 1 | 0 | 0 |
| 2 | 0.01 | 0.05 |
| 3 | 0.03 | 0.1 |

While the invention has been described in detail and with reference to specific embodiments thereof, it will be apparent to one skilled in the art that various changes and modifications can be made therein without departing from the spirit and scope thereof.

What is claimed is:

1. An additive for the continuous casting of steel comprising as a base material a non-acidic amorphous fluorine-containing calcium silicate powder having the composition xCaO.SiO$_2$.yF, wherein $1.0 \leq x \leq 1.4$ and $0.05 \leq y \leq 1.5$, containing up to 10% by weight R$_2$O$_3$, wherein R represents Al and Fe, and up to 1.5% by weight P$_2$O$_5$.

2. An additive for continuous casting according to claim 1 wherein the amorphous fluorine-containing calcium silicate is a weakly basic fluorine-containing calcium silicate having the composition xCaO.SiO$_2$.yF, wherein $1.05 \leq x \leq 1.30$ and $0.05 \leq y \leq 1.2$.

3. An additive for continuous casting according to claim 1, or 2 wherein the amorphous fluorine-containing calcium silicate is a granulated product of slag produced as a by-product in a method for producing yellow phosphorus by melting a mixture of phosphorus rock, silica, and a carbon material in an electric furnace.

4. An additive for continuous casting according to claim 3 wherein the granulated slag is produced by a method for producing yellow phosphorus including adding a fluorine-containing material and an aluminum-containing material while producing the yellow phosphorus in an electric furnace.

5. An additive for continuous casting according to claim 1, or 2 wherein the amorphous fluorine-containing calcium silicate is a glass powder obtained by heating and melting a mixture of a calcium-containing material, a silicic acid-containing material, and a fluorine-containing material to obtain a glass product, and then granulating it.

6. An additive for continuous casting according to claims 1, or 2, wherein the amorphous fluorine-containing calcium silicate is a powder having a specific surface area in the range of from about 2000 to 3500 cm$^2$/g as measured by Blaine permeameter.

7. An additive for continuous casting according to claim 1, or 2 comprising granules of a mixture obtained by mixing the amorphous fluorine-containing calcium silicate as a base material together with a sodium containing alkali agent and a carbon material.

8. An additive for continuous casting according to claim 7 wherein the alkali agent is an alkali glass powder.

9. An additive for continuous casting according to claim 7 wherein the composition of the mixture of the amorphous fluorine-containing calcium silicate and the alkali silicate glass powder has the composition (0.1 to 0.3)M$_2$O.(0.6 to 1.5)CaO.SiO$_2$.(0.1 to 1.0)F, wherein M represents Na or K.

10. An additive for continuous casting according to claim 7 wherein the composition of the mixture comprises from 60 to 90% by weight of the amorphous fluorine-containing calcium silicate powder, from 5 to 35% by weight of an alkali agent, and from 1 to 5 parts by weight of a carbon material based on the total weight of the composition.

11. An additive for continuous casting according to claim 7 wherein the granules are those obtained by pelletizing the mixture using a water glass solution as a binder.

12. An additive for continuous casting according to claim 7 wherein the particle size of the granules is in the range of from about 0.5 to 4 mm in average diameter.

13. An additive for continuous casting according to claim 7, wherein said carbon material is coke.

14. An additive for continuous casting according to claim 8, wherein said alkali glass powder is a soda-lime glass, a sodium silicate glass, or a combination thereof.

15. An additive for continuous casting according to claim 8, wherein the mixture of the amorphous fluorine-containing calcium silicate and the alkali silicate glass powder has the composition (0.1 to 0.3)M$_2$O.(0.6 to 1.5)CaO.SiO$_2$.(0.1 to 1.0)F, wherein M represents Na or K.

16. An additive for continuous casting according to claim 11, wherein the particle size of the granules is in the range of from about 0.5 to 4 mm in average diameter.

17. An additive for continuous casting according to claim 1, or 2, wherein said powder contains from 1 to 8% by weight R$_2$O$_3$.

* * * * *